United States Patent
Mizutani et al.

(10) Patent No.: US 10,892,522 B2
(45) Date of Patent: Jan. 12, 2021

(54) NONAQUEOUS ELECTROLYTIC SOLUTION AND LITHIUM SECONDARY BATTERY

(71) Applicant: TOYOTA JIDOSHA KABUSHIKI KAISHA, Toyota (JP)

(72) Inventors: Mamoru Mizutani, Nagakute (JP); Akira Kohyama, Toyota (JP); Akira Tsujiko, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 353 days.

(21) Appl. No.: 15/845,418

(22) Filed: Dec. 18, 2017

(65) Prior Publication Data

US 2018/0183101 A1 Jun. 28, 2018

(30) Foreign Application Priority Data

Dec. 27, 2016 (JP) .................. 2016-253136

(51) Int. Cl.
*H01M 10/0567* (2010.01)
*H01M 10/0568* (2010.01)
*H01M 10/0525* (2010.01)
*H01M 4/587* (2010.01)

(52) U.S. Cl.
CPC ....... *H01M 10/0567* (2013.01); *H01M 4/587* (2013.01); *H01M 10/0525* (2013.01); *H01M 10/0568* (2013.01); *H01M 2220/30* (2013.01); *H01M 2300/0025* (2013.01); *Y02E 60/10* (2013.01); *Y02T 10/70* (2013.01)

(58) Field of Classification Search
CPC ......... H01M 10/0567; H01M 10/0568; H01M 10/0525; H01M 4/587; H01M 2220/30; H01M 2300/0025; Y02E 60/122; Y02E 60/10; Y02T 10/7011; Y02T 10/70
See application file for complete search history.

(56) References Cited

U.S. PATENT DOCUMENTS

2016/0233546 A1 8/2016 Feng et al.

FOREIGN PATENT DOCUMENTS

| CN | 101599556 | * 12/2009 |
|---|---|---|
| CN | 104600364 A | 5/2015 |
| JP | 06-064456 A | 3/1994 |
| JP | 06-176768 A | 6/1994 |
| JP | 2007-165125 A | 6/2007 |
| JP | 2010-050023 A | 3/2010 |
| JP | 2016-001567 A | 1/2016 |
| JP | 2016-146329 A | 8/2016 |

* cited by examiner

*Primary Examiner* — Laura Weiner
(74) *Attorney, Agent, or Firm* — Sughrue Mion, PLLC

(57) ABSTRACT

A nonaqueous electrolytic solution is a nonaqueous electrolytic solution for a lithium secondary battery, the lithium secondary battery including a positive electrode that includes a positive electrode active material, and a negative electrode that includes a negative electrode active material which is a carbonaceous material storing and releasing a lithium ion. The nonaqueous electrolytic solution includes: one or more anions selected from an oxalato borate anion and an oxalato phosphate anion; and one or more arylamine compounds. The nonaqueous electrolytic solution is present between the positive electrode and the negative electrode and conducts a lithium ion.

4 Claims, 1 Drawing Sheet

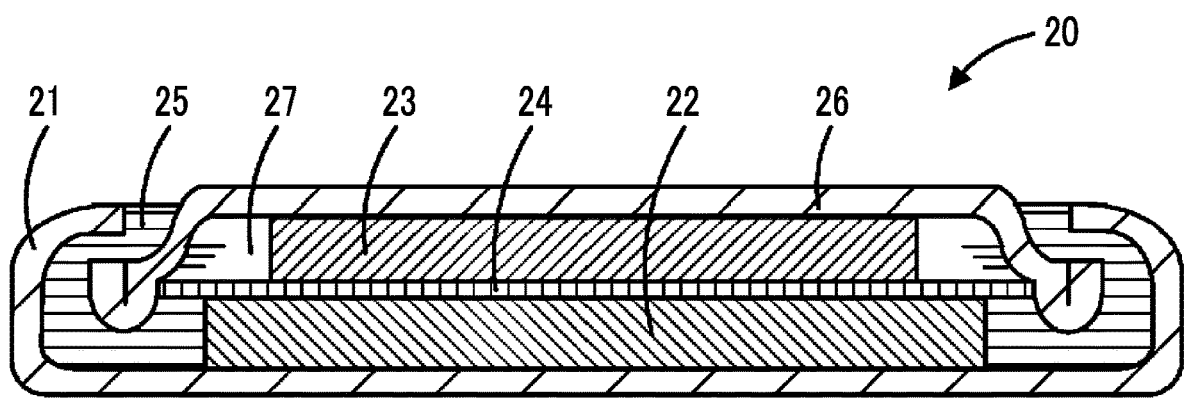

NONAQUEOUS ELECTROLYTIC SOLUTION AND LITHIUM SECONDARY BATTERY

INCORPORATION BY REFERENCE

The disclosure of Japanese Patent Application No. 2016-253136 filed on Dec. 27, 2016 including the specification, drawings and abstract is incorporated herein by reference in its entirety.

BACKGROUND

1. Technical Field

The present disclosure disclosed in this specification relates to a nonaqueous electrolytic solution and a lithium secondary battery.

2. Description of Related Art

In the related art, a lithium secondary battery in which 4,4'-methylenebis(N,N-dimethylaniline) is added to a nonaqueous electrolytic solution is disclosed (for example, Japanese Unexamined Patent Application Publication No. 6-64456 (JP 6-64456 A)). In this lithium secondary battery, a positive electrode active material is not likely to react with an electrolytic solvent during charging, and storage characteristics and charging-discharging cycle characteristics are superior. In addition, a lithium secondary battery in which one aniline derivative selected from 3-methyl-N,N-dimethylaniline, N,N,3,5-tetramethylaniline, and 3-methoxy-N,N-dimethylaniline and a cyclic phosphazene compound are added to a nonaqueous electrolytic solution is disclosed (for example, Japanese Unexamined Patent Application Publication No. 2010-50023 (JP 2010-50023 A)). In this lithium secondary battery, flame retardance is imparted by the cyclic phosphazene compound, the irreversible capacity is small, and the charge-discharge efficiency is high. In addition, a lithium secondary battery in which one or more compounds selected from an aniline, a pyrrole, and a furan are added to a nonaqueous electrolytic solution is disclosed (for example, Japanese Unexamined Patent Application Publication No. 2016-1567 (JP 2016-1567 A)). In this lithium secondary battery, charging-discharging cycle characteristics at a high temperature can be further improved.

SUMMARY

However, in the battery disclosed in JP 6-64456 A, charging-discharging characteristics are further improved by adding the specific compound to the electrolytic solution. However, the charging-discharging characteristics are not sufficient, and a new additive for further improving charging-discharging characteristics is needed.

The present disclosure provides a new nonaqueous electrolytic solution for further improving charging-discharging characteristics, and a new lithium secondary battery.

The present inventors performed a thorough investigation and found that a new nonaqueous electrolytic solution for improving further charging-discharging characteristics, and a new lithium secondary battery can be provided by adding an anion including boron or phosphorus and an arylamine compound to a nonaqueous electrolytic solution, thereby completing the disclosure disclosed in this specification.

A first aspect of the disclosure relates to a nonaqueous electrolytic solution used for a lithium secondary battery. The nonaqueous electrolytic solution is a nonaqueous electrolytic solution for a lithium secondary battery, the lithium secondary battery including a positive electrode that includes a positive electrode active material, and a negative electrode that includes a negative electrode active material which is a carbonaceous material storing and releasing a lithium ion. The nonaqueous electrolytic solution includes one or more anions selected from anions represented by the following Formulae (1) to (5) and one or more arylamine compounds selected from arylamine compounds represented by the following Formulae (6) to (9). The nonaqueous electrolytic solution is present between the positive electrode and the negative electrode and conducts the lithium ion. In the arylamine compounds, each of $R^1$, $R^2$, $R^5$, and $R^6$ is an alkyl group including one to four carbon atoms, $R^3$ is selected from among the group consisting of a hydrogen atom, a methyl group, a nitro group, a nitroso group, a dimethylamino group, a diethylamino group, a dipropylamino group, and a sulfonyl fluoride group, $R^4$ is selected from among the group consisting of a direct bond, an azo group, a phosphorus atom, or a boron atom, and X is one or two.

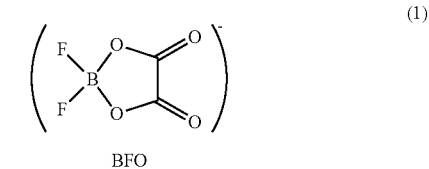

BFO (1)

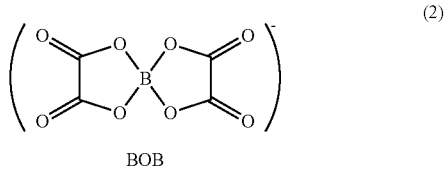

BOB (2)

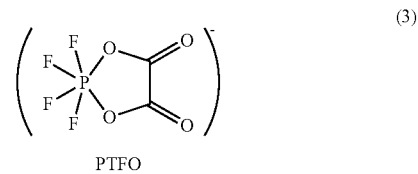

PTFO (3)

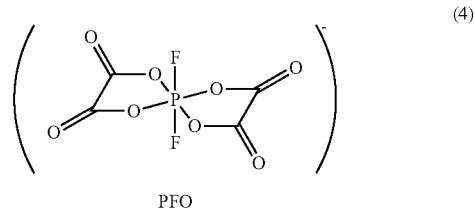

PFO (4)

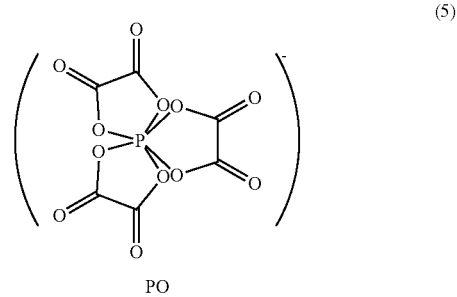

PO (5)

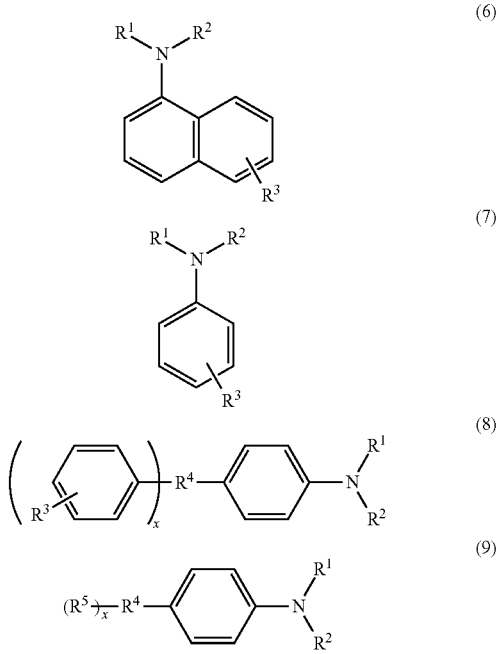

In the nonaqueous electrolytic solution according to the first aspect, the arylamine compounds may be one or more compounds selected from N,N-dimethyl-1-naphthylamine, 1,8-bis(dimethylamino)naphthalene, and 5-dimethylaminonaphthalene-1-sulfonyl fluoride.

In the nonaqueous electrolytic solution according to the first aspect, the arylamine compounds may be one or more compounds selected from dimethylaniline, diethylaniline, diisopropylaniline, N,N,4-trimethylaniline, and 4-nitroso-N,N-dimethylaniline.

In the nonaqueous electrolytic solution according to the first aspect, the arylamine compounds may be one or more compounds selected from N,N-dimethyl-4-(phenylazo)aniline, 4-(diphenylphosphino)-N,N-dimethylaniline, 4,4'-bis(dimethylamino)biphenyl, and 4-(di-tert-butylphosphino)-N,N-dimethylaniline.

In the nonaqueous electrolytic solution according to the first aspect, the anions may be one or more anions selected from BFO represented by Formula (1) and BOB represented by Formula (2).

The nonaqueous electrolytic solution according to the first aspect may further include an organic solvent. A content of the anions may be 0.1 mol/L to a saturated concentration with respect to the organic solvent.

In the nonaqueous electrolytic solution according to the first aspect, a content of the arylamine compounds may be 0.01 mass % to 10 mass % with respect to a total mass of the nonaqueous electrolytic solution.

A second aspect of the disclosure relates to a lithium secondary battery. The lithium secondary battery includes: a positive electrode including a positive electrode active material; a negative electrode including a negative electrode active material which is a carbonaceous material storing and releasing the lithium ion; and the nonaqueous electrolytic solution being present between the positive electrode and the negative electrode and conducting the lithium ion.

The nonaqueous electrolytic solution and the lithium secondary battery are new and can further improve charging-discharging characteristics. The reason why the effect can be obtained is presumed to be that, in a case where the anions and the arylamine compounds are added, a film having low electron conductivity is formed on the negative electrode and further suppresses decomposition of the nonaqueous electrolytic solution.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1 is a schematic diagram showing an example of a configuration of a lithium secondary battery 20.

DETAILED DESCRIPTION OF EMBODIMENTS

A lithium secondary battery described in an embodiment includes: a positive electrode including a positive electrode active material; a negative electrode including a negative electrode active material which is a carbonaceous material capable of storing and releasing a lithium ion; and a nonaqueous electrolytic solution being present between the positive electrode and the negative electrode and conducting a lithium ion.

The positive electrode may include a positive electrode active material capable of storing and releasing a lithium ion. The positive electrode may be formed, for example, by mixing a positive electrode active material, a conductive material, and a binder with each other, adding an appropriate solvent to the obtained mixture to obtain a paste-like positive electrode material, applying the positive electrode material to a surface of a current collector, drying the applied positive electrode material, and optionally compressing the dried positive electrode material to increase the electrode density. As the positive electrode active material, for example, a sulfide including a transition metal element or an oxide including lithium and a transition metal element can be used. Specifically, a transition metal sulfide such as $TiS_2$, $TiS_3$, $MoS_3$, or $FeS_2$, a lithium manganese composite oxide having a basic composition formula represented by, for example, $Li_{(1-x)}MnO_2$ (for example, $0<x<1$; hereinafter, the same shall be applied) or $Li_{(1-x)}Mn_2O_4$, a lithium cobalt composite oxide having a basic composition formula represented by, for example, $Li_{(1-x)}CoO_2$, a lithium nickel composite oxide having a basic composition formula represented by, for example, $Li_{(1-x)}NiO_2$, a lithium nickel cobalt manganese composite oxide having a basic composition formula represented by, for example, $Li_{(1-x)}Ni_aCo_bMn_cO_2$ ($a+b+c=1$), a lithium vanadium composite oxide having a basic composition formula represented by, for example, $LiV_2O_3$, or a transition metal oxide having a basic composition formula represented by, for example, $V_2O_5$ can be used. Among these, a lithium transition metal composite oxide, for example, $LiCoO_2$, $LiNiO_2$, $LiMnO_2$, $LiNi_{1/3}Co_{1/3}Mn_{1/3}O_2$, $LiV_2O_3$ is preferable. "Basic composition formula" represents that other elements may be further included. The conductive material is not particularly limited as long as it is an electron-conductive material that does not adversely affect the battery performance of the positive electrode. For example, one kind or a mixture of two or more kinds selected from graphite such as natural graphite (scaly graphite or flaky graphite) or artificial graphite, acetylene black, carbon black, Ketjen black, carbon whisker, needle coke, carbon fiber, and metal (for example, copper, nickel, aluminum, silver, or gold) can be used. Among these, carbon black or acetylene black is preferable as the conductive material from the viewpoints of electron conductivity and coating properties. The binder functions to bind active material particles and conductive material particles. For example, one kind or a mixture of two or more kinds selected from a fluororesin such as polytetrafluoroethylene (PTFE), polyvinylidene fluoride (PVdF), or a fluororubber, a thermoplastic resin such as polypropylene or polyethylene, an ethylene-propylene-diene monomer (EPDM) rubber, a sulfonated EPDM rubber, and a natural butyl rubber (NBR) can be used. In addition, for example, an aqueous dispersion of a cellulose or styrene-butadiene rubber (SBR) that is an aqueous binder can also be used. As a solvent in which the positive electrode active material, the conductive material, and the binder are dispersed, for example, an organic solvent such as N-methylpyrrolidone, dimethylformamide, dimethylacetamide, methyl ethyl ketone, cyclohexanone, methyl acetate, methyl acrylate, diethylenetriamine, N,N-dimethylaminopropylamine, ethylene oxide, or tetrahydrofuran can be used. In addition, the active material may be converted into a slurry by adding a dispersant, a thickener, or the like to water and using a latex such as SBR. As the thickener, for example, one kind or a mixture of two or more kinds selected from polysaccharides such as carboxymethyl cellulose or methyl cellulose can be used. Examples of a coating method include a roll coating method using an applicator roll or the like, a screen coating method, a doctor blade coating method, a spin coating method, and a method using a bar coater. Using one of the methods, an arbitrary thickness and an arbitrary shape can be obtained. As the current collector, for example, aluminum, titanium, stainless steel, nickel, iron, baked carbon, a conductive polymer or conductive glass can be used. In addition, in order to improve adhesion, conductivity, and oxidation resistance, for example, aluminum or copper having a surface treated with carbon, nickel, titanium, or silver can also be used. A surface of the current collector may undergo an oxidation treatment. Examples of a shape of the current collector include a foil shape, a film shape, a sheet shape, a net shape, a punched or expanded shape, a lath shape, a porous shape, a foam shape, and a compact shape of a fiber group. The thickness of the current collector is, for example, 1 μm to 500 μm.

The negative electrode of the lithium secondary battery may be formed by adhering the negative electrode active material and the current collector to each other, or may be formed, for example, by mixing a negative electrode active material, a conductive material, and a binder with each other, adding an appropriate solvent to the obtained mixture to obtain a paste-like negative electrode material, applying the negative electrode material to a surface of a current collector, drying the applied negative electrode material, and optionally compressing the dried negative electrode material to increase the electrode density. Examples of the negative electrode active material include a coke, a glassy carbon, a graphite, a non-graphitizable carbon, a pyrolytic carbon, and a carbon fiber. Among these, a graphite such as artificial graphite or natural graphite is preferable because it has a similar action potential to lithium metal, enables charging and discharging at a high operating voltage, and suppresses self-discharge in a case where a lithium salt is used as a supporting electrolyte, and can reduce the irreversible capacity during charging. In addition, as the conductive material, the binder, and a solvent used for the negative electrode, the examples described above regarding the positive electrode can be used. As the current collector of the negative electrode, for example, copper, nickel, stainless steel, titanium, aluminum, baked carbon, a conductive polymer, conductive glass, or an Al—Cd alloy can be used. In addition, in order to improve adhesion, conductivity, and reduction resistance, for example, copper having a surface treated with carbon, nickel, titanium, or silver can also be used. A surface of the current collector may undergo an oxidation treatment. Examples of a shape of the current collector include the shapes described above regarding the positive electrode.

As the nonaqueous electrolytic solution of the lithium secondary battery, a nonaqueous electrolytic solution in which an organic solvent includes a supporting electrolyte can be used. Examples of the organic solvent include a carbonate and a fluorine-containing carbonate. Examples of the carbonate include: a cyclic carbonate such as ethylene carbonate (EC), propylene carbonate, vinylene carbonate, butylene carbonate, or chloroethylene carbonate; and a chain carbonate such as dimethyl carbonate (DMC), ethyl methyl carbonate (EMC), diethyl carbonate, ethyl-n-butyl carbonate, methyl-t-butyl carbonate, di-i-propyl carbonate, or t-butyl-i-propyl carbonate. As the fluorine-containing carbonate, a carbonate in which one or more hydrogen atoms are substituted with fluorine, for example, fluorinated cyclic carbonate or fluorinated chain carbonate may be used. Specific examples of the fluorine-containing carbonate include monofluoroethylene carbonate, difluoroethylene carbonate, fluoromethyl methyl carbonate, difluoromethyl methyl carbonate, trifluoromethyl methyl carbonate, and fluoromethyl difluoromethyl carbonate. Not only a carbonate, but also one or more other solvents selected from an ester, an ether, a nitrile, a furan, a sulfolane, a dioxolane, and the like may be added to the nonaqueous electrolytic solution. The other solvents may not be added to the electrolytic solution, or may be added to the electrolytic solution in a small amount of, for example, 10 vol % or lower in which characteristics of the electrolytic solution do not change.

Examples of the supporting electrolyte included in the nonaqueous electrolytic solution include $LiPF_6$, $LiBF_4$, $LiAsF_6$, $LiCF_3SO_3$, $LiN(CF_3SO_2)_2$, $LiC(CF_3SO_2)_3$, $LiSbF_6$, $LiSiF_6$, $LiAlF_4$, $LiSCN$, $LiClO_4$, $LiCl$, $LiF$, $LiBr$, $LiI$, and $LiAlCl_4$. Among these, one salt or a combination of two or more salts selected from inorganic salts such as $LiPF_6$, $LiBF_4$, $LiAsF_6$, or $LiClO_4$ and organic salts such as $LiCF_3SO_3$, $LiN(CF_3SO_2)_2$, or $LiC(CF_3SO_2)_3$ is preferably used from the viewpoint of electrical characteristics. The concentration of the supporting electrolyte in the nonaqueous electrolytic solution is preferably 0.1 mol/L to 5 mol/L and more preferably 0.5 mol/L to 2 mol/L. In a case where the concentration of the supporting electrolyte is 0.1 mol/L or higher, a sufficient current density can be obtained. In a case where the concentration of the supporting electrolyte is 5 mol/L or lower, the electrolytic solution can be made more stable.

The nonaqueous electrolytic solution includes: one or more anions selected from an oxalato borate anion and an oxalato phosphate anion; and one or more arylamine compounds. The anions are one or more anions selected from BFO, BOB, PTFO, PFO, and PO represented by the following Formulae (1) to (5). Among these, BFO or BOB is preferable, and BFO is more preferable as the anions added to the nonaqueous electrolytic solution. A counter cation of the anions may be an alkali metal ion such as lithium ion, a sodium ion, or a potassium ion. Among these, a lithium ion is preferable. The addition amount of the anions is preferably 0.1 mol/L to a saturated concentration, more preferably 0.5 mol/L to 5 mol/L, and still more preferably 0.5 mol/L to 2 mol/L with respect to the organic solvent. In a case where the addition amount is 0.1 mol/L to a saturated concentration, the addition effect can be significantly exhibited, which is preferable.

The arylamine compounds included in the nonaqueous electrolytic solution are one or more arylamine compounds selected from arylamine compounds represented by the following Formulae (6) to (9). In the formulae, each of $R^1$, $R^2$, $R^5$, and $R^6$ independently represent an alkyl group having one to four carbon atoms. Examples of the alkyl group include a methyl group, an ethyl group, an n-propyl group, an isopropyl group, an n-butyl group, a sec-butyl group, an isobutyl group, and a tert-butyl group. In addition, each of $R^3$'s may independently represent one or two or more substituents of a benzene ring. Examples of the substituent include a hydrogen atom, a methyl group, a nitro group, a nitroso group, a dimethylamino group, a diethylamino group, a dipropylamino group, and a sulfonyl fluoride group. In addition, each of $R^4$'s independently represent a direct bond, an azo group (—N=N—), a phosphorus atom (P), or a boron atom (B). In addition, X represents one or two and is determined depending on $R^4$. For example, in a case where $R^4$ represents a direct bond or an azo group, X represents one, and in a case where $R^4$ represents P or B, X represents two. For example, the addition amount of the arylamine compounds is preferably 0.01 mass % to 10 mass %, more preferably 0.05 mass % to 5 mass %, and still more preferably 0.1 mass % to 1 mass % with respect to the total mass of the nonaqueous electrolytic solution. In a case where the addition amount is 0.01 mass % or higher, the addition effect can be significantly exhibited. In a case where the addition amount is 10 mass % or lower, there is little effect on lithium ion conduction, which is preferable.

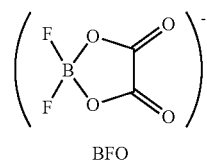

BFO (1)

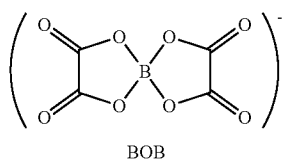

BOB (2)

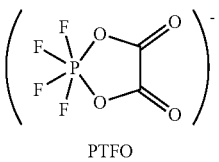

PTFO (3)

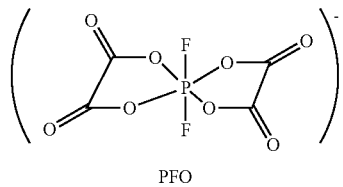

PFO (4)

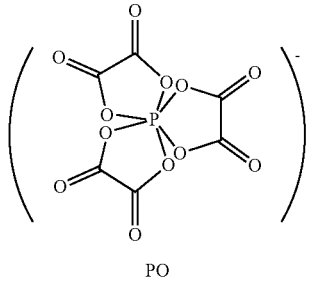

PO (5)

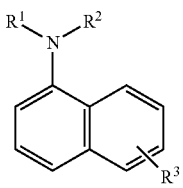

(6)

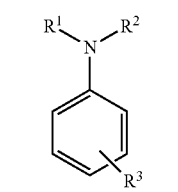

(7)

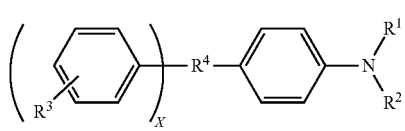

(8)

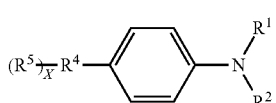

(9)

The arylamine compounds may be one or more compounds selected from compounds represented by the following Formulae (10) to (21). Specific examples of the naphthalene compound represented by Formula (6) include N,N-dimethyl-1-naphthylamine represented by Formula (10), 1,8-bis(dimethylamino)naphthalene represented by Formula (11), and 5-dimethylaminonaphthalene-1-sulfonyl fluoride represented by Formula (12). In addition, specific examples of the aniline compound represented by Formula (7) include dimethylaniline represented by Formula (13), diethylaniline represented by Formula (14), diisopropylaniline represented by Formula (15), N,N,4-trimethylaniline represented by Formula (16), and 4-nitroso-N,N-dimethylaniline represented by Formula (17). In addition, specific examples of the compound having two or more phenyl groups represented by Formula (8) include N,N-dimethyl-4-(phenylazo)aniline represented by Formula (18), 4-(diphenylphosphino)-N,N-dimethylaniline represented by Formula (19), and 4,4'-bis(dimethylamino)biphenyl represented by Formula (20). In addition, specific examples of the arylamine compound represented by Formula (9) include 4-(di-tert-butylphosphino)-N,N-dimethylaniline represented by Formula (21).

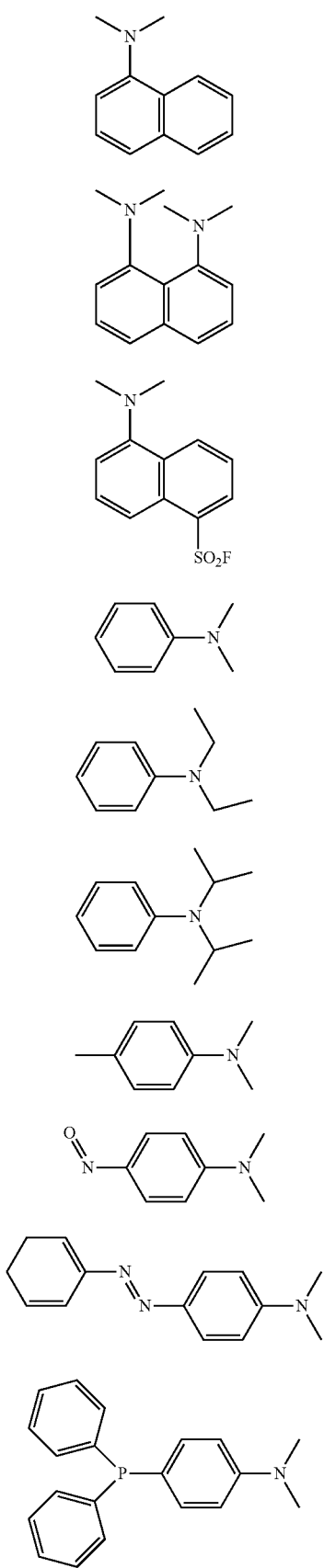

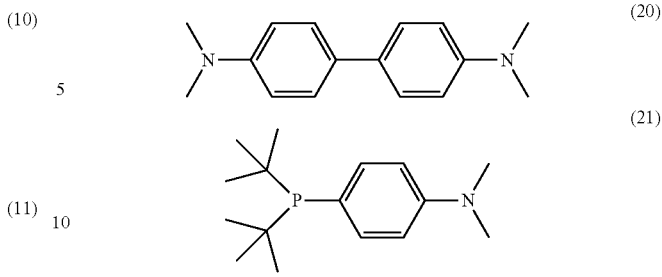

In the lithium secondary battery, a separator may be provided between the negative electrode and the positive electrode. The separator is not particularly limited as long as it has a composition that can withstand a range of use of the lithium secondary battery, and examples thereof include: a polymer non-woven fabric such as polypropylene non-woven fabric or polyphenylene sulfide non-woven fabric; and a thin microporous membrane of a polyolefin resin such as polyethylene or polypropylene. Among these, one kind may be used alone, or a mixture of plural kinds may be used.

A shape of the lithium secondary battery is not particularly limited, and examples thereof include a coin shape, a button shape, a sheet shape, a laminated shape, a cylindrical shape, a flat shape, and a square shape. In addition, the lithium secondary battery is also applicable to a large secondary battery used for an electric vehicle or the like.

FIG. 1 is a sectional view showing a schematic configuration of a coin lithium secondary battery 20. The lithium secondary battery 20 includes: a cup-shaped case 21; a positive electrode 22 that includes a positive electrode active material and is provided in a lower portion of the case 21; a negative electrode 23 that includes a negative electrode active material and is provided on the opposite side of the separator 24 from the positive electrode 22; a gasket 25 that is formed of an insulating material; and a sealing plate 26 that is provided in an opening of the case 21 and seals the case 21 through the gasket 25. In the lithium secondary battery 20, a nonaqueous electrolytic solution 27 is present in a space between the positive electrode 22 and the negative electrode 23. In the lithium secondary battery 20, the negative electrode 23 includes a negative electrode active material, such as graphite, storing and releasing a lithium ion. In addition, the nonaqueous electrolytic solution 27 includes: one or more anions selected from an oxalato borate anion and an oxalato phosphate anion represented by Formulae (1) to (5); and one or more arylamine compounds.

The lithium secondary battery described above in detail is new and can further improve charging-discharging characteristics. The reason why the effect can be obtained is presumed to be that, in a case where the anions represented by Formulae (1) to (5) and the arylamine compounds are added, a film having low electron conductivity is formed on the negative electrode and further suppresses decomposition of the nonaqueous electrolytic solution.

The disclosure is not limited to the embodiment and can be practiced in various forms within the technical scope of the disclosure.

For example, in the embodiment, the lithium ion secondary battery in which the positive electrode stores and releases a lithium ion has been mainly described. In a case where the negative electrode stores and releases a lithium ion, the positive electrode is not particularly limited to the embodiment. The reason for this is that the anions or the arylamine compounds included in the nonaqueous electrolytic solution do not affect the positive electrode and act on the negative electrode. Accordingly, the lithium secondary battery can be used not only for a lithium ion secondary battery but also for various power storage devices such as an electric double layer capacitor or an electrochemical capacitor.

Hereinafter, specific examples of manufacturing the nonaqueous electrolytic solution and the lithium secondary battery will be described as experimental examples. Experimental Examples 1 to 12 correspond to Examples, and Experimental Example 13 corresponds to Comparative Example.

Experimental Example 1

Fluorinated cyclic carbonate (fluorinated ethylene carbonate) and fluorinated chain carbonate (fluorinated ethyl methyl carbonate) were mixed with each other at a volume ratio of 30/70 to prepare a solvent. Next, 1.1 mol/L of $LiPF_6$ as a supporting electrolyte was added to the solvent, and lithium difluoro(oxalato)borate (LiBFO) was dissolved in the solvent until it reached a saturated state. Further, 1 mass % of N,N-dimethyl-4-(phenylazo)aniline (Formula (18)) as an arylamine compound with respect to the total mass of the electrolytic solution was dissolved in the electrolytic solution. The obtained electrolytic solution was set as an electrolytic solution according to Experimental Example 1.

Experimental Examples 2 to 12

An electrolytic solution according to Experimental Example 2 was obtained through the same steps as those in Experimental Example 1, except that 0.1 mass % of 4-(diphenylphosphino)-N,N-dimethylaniline (Formula (19)) as an arylamine compound with respect to the total mass of the electrolytic solution was dissolved in the electrolytic solution. An electrolytic solution according to Experimental Example 3 was obtained through the same steps as those in Experimental Example 1, except that 0.1 mass % of 5-dimethylaminonaphthalene-1-sulfonyl fluoride (Formula (12)) as an arylamine compound with respect to the total mass of the electrolytic solution was dissolved in the electrolytic solution. An electrolytic solution according to Experimental Example 4 was obtained through the same steps as those in Experimental Example 1, except that 0.1 mass % of 4,4'-bis(dimethylamino)biphenyl (Formula (20)) as an arylamine compound with respect to the total mass of the electrolytic solution was dissolved in the electrolytic solution. An electrolytic solution according to Experimental Example 5 was obtained through the same steps as those in Experimental Example 1, except that 1 mass % of dimethylaniline (Formula (13)) as an arylamine compound with respect to the total mass of the electrolytic solution was dissolved in the electrolytic solution. An electrolytic solution according to Experimental Example 6 was obtained through the same steps as those in Experimental Example 1, except that 1 mass % of diethylaniline (Formula (14)) as an arylamine compound with respect to the total mass of the electrolytic solution was dissolved in the electrolytic solution. An electrolytic solution according to Experimental Example 7 was obtained through the same steps as those in Experimental Example 1, except that 1 mass % of diisopropylaniline (Formula (15)) as an arylamine compound with respect to the total mass of the electrolytic solution was dissolved in the electrolytic solution. An electrolytic solution according to Experimental Example 8 was obtained through the same steps as those in Experimental Example 1, except that 1 mass % of N,N,4-trimethylaniline (Formula (16)) as an arylamine compound with respect to the total mass of the electrolytic solution was dissolved in the electrolytic solution. An electrolytic solution according to Experimental Example 9 was obtained through the same steps as those in Experimental Example 1, except that 0.1 mass % of 4-nitroso-N,N-dimethylaniline (Formula (17)) as an arylamine compound with respect to the total mass of the electrolytic solution was dissolved in the electrolytic solution. An electrolytic solution according to Experimental Example 10 was obtained through the same steps as those in Experimental Example 1, except that 1 mass % of N,N-dimethyl-1-naphthylamine (Formula (10)) as an arylamine compound with respect to the total mass of the electrolytic solution was dissolved in the electrolytic solution. An electrolytic solution according to Experimental Example 11 was obtained through the same steps as those in Experimental Example 1, except that 0.1 mass % of 1,8-bis(dimethylamino)naphthalene (Formula (11)) as an arylamine compound with respect to the total mass of the electrolytic solution was dissolved in the electrolytic solution. An electrolytic solution according to Experimental Example 12 was obtained through the same steps as those in Experimental Example 1, except that 0.1 mass % of 4-(di-tert-butylphosphino)-N,N-dimethylaniline (Formula (21)) as an arylamine compound with respect to the total mass of the electrolytic solution was dissolved in the electrolytic solution.

Experimental Example 13

An electrolytic solution according to Experimental Example 13 was obtained through the same steps as those in Experimental Example 1, except that no arylamine compound was added.

Cyclic Voltammogram Measurement

A cyclic voltammogram of each of the manufactured nonaqueous electrolytic solutions was measured using the following method to evaluate charging-discharging characteristics. In the measurement, a two-electrode cell was used including: a working electrode including artificial graphite as a negative electrode active material; a counter electrode including lithium metal; and a nonaqueous electrolytic solution present between the working electrode and the counter electrode. The working electrode was prepared by mixing artificial graphite, carboxymethyl cellulose (CMC), and styrene-butadiene rubber (SBR) at a mass ratio of 96:2:2, dispersing the obtained mixture in water to obtain a paste, applying the paste to a copper foil, and drying and pressing the applied paste. In the two-electrode cell, a potential scanning range was set as 3.0 V to 0.0 V in terms of a lithium reference potential, the potential was scanned from 3.0 V to the low potential side, and was scanned again from 0.0 V to the high potential side. The scanning rate was set as 0.1 mV/s.

According to the measurement result of the cyclic voltammogram of Experimental Example 1, during the scanning to the low potential side, reduction currents corresponding to decomposition or electrodeposition of the arylamine compound were observed at about 2.8 V, at about 1.8 V, and at about 1.2 V. Next, reversible currents corresponding to storage and release of lithium ions were observed. Assuming that a negative electrode side reaction ($Li^+ + e^- = Li$) occurred in the lithium ion secondary battery, it was found that, in the cell to which the BFO anion and the arylamine compound were added, cycle characteristics were superior, and the electrolytic solution of the lithium ion secondary battery functioned effectively.

Evaluation Based on Change Δm in Mass and Change ΔQ in Electric Quantity Measured by Electrode Transducer In each of the manufactured nonaqueous electrolytic solutions, a change in mass and a change in electric quantity were investigated. As a measuring device, a quartz crystal electrochemical measurement system (EQCM; QCA922, manufactured by Seiko EG&G Co., Ltd.) and an electrochemical measurement system (Model 263A, manufactured by Princeton Applied Research) were used. In this measurement, a three-electrode cell was used including: a test electrode; a reference electrode; a counter electrode; and a nonaqueous electrolytic solution present between the test electrode, the counter electrode, and the reference electrode. As the test electrode, a carbon electrode prepared by sputtering was used. As the counter electrode and the reference electrode, a lithium metal foil adhered to stainless steel metal was used. In the three-electrode cell, a potential scanning range was set as 3.0 V to 0.0 V in terms of a lithium reference potential, the potential was scanned from 3.0 V to the low potential side, and was scanned again from 0.0 V to the high potential side. The cyclic voltammogram, and a change in the resonance frequency of the transducer depending on a change in potential were recorded. Five cycles of the potential scanning were performed. The scanning rate was set as 10.0 mV/s. In the measurement, in a case where a material was attached to a surface of the electrode transducer, the frequency changed, and a change in mass (Δm) was obtained from the Sauerbrey equation based on the change in frequency. The change in mass of the first cycle is represented by Δm1, and an increase in the electric quantity of the first cycle is represented by ΔQ1. An increase in mass of the n-th cycle is represented by Δmn, and an increase in electric quantity of the n-th cycle is represented by ΔQn. The change in mass was evaluated as a value (Δmn/Δm1) normalized by the measured value Δm1 of the first cycle. Likewise, the change in electric quantity was evaluated as a value (ΔQn/ΔQ1) normalized by the measured value ΔQ1 of the first cycle. As the amount Δmn/Δm1 of change in the mass decreases per cycle, the formation of deposits on the electrode is more likely to be suppressed. As the change ΔQn/ΔQ1 in electric quantity decreases per cycle, an unnecessary electrochemical reaction on the electrodes is more likely to be suppressed.

Results and Discussion

Tables 1 and 2 show the amounts Δmn/Δm1 of change in mass and the changes ΔQn/ΔQ1 in electric quantity of Experimental Examples 1 to 13. As shown in Tables 1 and 2, in Experimental Example 13 in which no arylamine compound was added, the change in mass of the second or subsequent cycle was larger than that of the first cycle, and the change in electric quantity was also not sufficiently small. Therefore, it was found that an effect of suppressing a side reaction occurring on the electrode was small. On the other hand, it was found that, in Experimental Examples 1 to 12, a film-forming material presumed to be derived from the additive in the first cycle was rapidly formed. In addition, regarding the change in mass measured by the transducer, the change in mass (Table 1) and the change in electric quantity (Table 2) of the second or subsequent cycle were small. Therefore, it was found that, by adding the BFO anion and the arylamine compound, a side reaction occurring on the electrode was suppressed by a film-forming material (protective film) formed in the first cycle.

TABLE 1

| | Change Δmn/Δm1[1)] in Mass Measured by Electrode Transducer Number n of Cycles | | | | |
|---|---|---|---|---|---|
| | 1 | 2 | 3 | 4 | 5 |
| Experimental Example 1 | 1.00 | 0.25 | 0.08 | 0.02 | 0.05 |
| Experimental Example 2 | 1.00 | 0.37 | 0.10 | 0.01 | 0.01 |
| Experimental Example 3 | 1.00 | 0.16 | 0.13 | 0.05 | 0.11 |
| Experimental Example 4 | 1.00 | 0.25 | 0.04 | 0.08 | 0.03 |
| Experimental Example 5 | 1.00 | 0.08 | 0.01 | 0.04 | 0.01 |
| Experimental Example 6 | 1.00 | 0.98 | 1.19 | 0.23 | 0.05 |
| Experimental Example 7 | 1.00 | 0.94 | 0.05 | 0.03 | 0.03 |
| Experimental Example 8 | 1.00 | 0.46 | 0.05 | 0.31 | 0.06 |
| Experimental Example 9 | 1.00 | 0.49 | 0.28 | 0.43 | 0.35 |
| Experimental Example 10 | 1.00 | 0.03 | 0.02 | 0.03 | 0.05 |
| Experimental Example 11 | 1.00 | 1.33 | 1.17 | 0.70 | 0.35 |
| Experimental Example 12 | 1.00 | 0.62 | 0.20 | 0.03 | 0.03 |
| Experimental Example 13 | 1.00 | 1.44 | 2.00 | 1.80 | 2.03 |

[1)]The value of the n-th cycle was normalized by the value of the first cycle as 1.00.

TABLE 2

| | Change ΔQn/ΔQ1[1)] in Electric Quantity measured by Electrode Transducer Number n of Cycles | | | | |
|---|---|---|---|---|---|
| | 1 | 2 | 3 | 4 | 5 |
| Experimental Example 1 | 1.00 | 0.14 | 0.05 | 0.04 | 0.03 |
| Experimental Example 2 | 1.00 | 0.17 | 0.05 | 0.03 | 0.03 |
| Experimental Example 3 | 1.00 | 0.09 | 0.06 | 0.05 | 0.04 |
| Experimental Example 4 | 1.00 | 0.16 | 0.05 | 0.03 | 0.03 |
| Experimental Example 5 | 1.00 | 0.31 | 0.14 | 0.06 | 0.04 |
| Experimental Example 6 | 1.00 | 0.26 | 0.12 | 0.08 | 0.06 |
| Experimental Example 7 | 1.00 | 0.22 | 0.10 | 0.05 | 0.03 |
| Experimental Example 8 | 1.00 | 0.28 | 0.10 | 0.06 | 0.05 |
| Experimental Example 9 | 1.00 | 0.68 | 0.59 | 0.53 | 0.47 |
| Experimental Example 10 | 1.00 | 0.24 | 0.10 | 0.05 | 0.04 |
| Experimental Example 11 | 1.00 | 0.50 | 0.29 | 0.14 | 0.07 |
| Experimental Example 12 | 1.00 | 0.38 | 0.12 | 0.07 | 0.06 |
| Experimental Example 13 | 1.00 | 0.70 | 0.64 | 0.55 | 0.50 |

[1)]The value of the n-th cycle was normalized by the value of the first cycle as 1.00.

The disclosure is not limited to the Examples and can be practiced in various forms within the technical scope of the disclosure.

The disclosure can be used in the technical field of a secondary battery.

What is claimed is:

1. A nonaqueous electrolytic solution for a lithium secondary battery, the lithium secondary battery including a positive electrode that includes a positive electrode active material, and a negative electrode that includes a negative electrode active material that is a carbonaceous material storing and releasing a lithium ion, the nonaqueous electrolytic solution comprising:
   one or more anions selected from anions represented by following Formulae (1) or (3) to (5),
   at least one arylamine compound selected from the group consisting of 1,8-bis(dimethylamino)naphthalene and 5-dimethylaminonaphthalene-1-sulfonyl fluoride;
   at least one lithium salt selected from the group consisting of $LiPF_6$, $LiBF_4$, $LiAsF_6$, $LiCF_3SO_3$, $LiN(CF_3SO_2)_2$, $LiC(CF_3SO_2)_3$, $LiSbF_6$, $LiSiF_6$, $LiAlF_4$, $LiSCN$, $LiClO_4$, $LiCl$, $LiF$, $LiBr$, $LiI$, and $LiAlCl_4$, and
   an organic solvent, wherein:
   the nonaqueous electrolytic solution is present between the positive electrode and the negative electrode and conducts the lithium ion; and a content of the at least one aryl amine compound is 0.01 mass % to 10 mass % with respect to a total mass of the nonaqueous electrolytic solution;

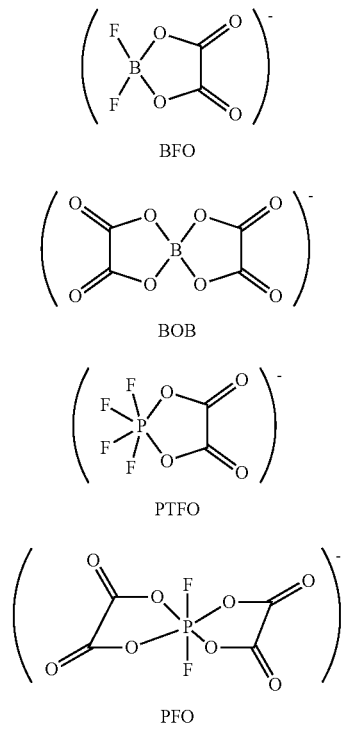

BFO (1)

BOB (2)

PTFO (3)

PFO (4)

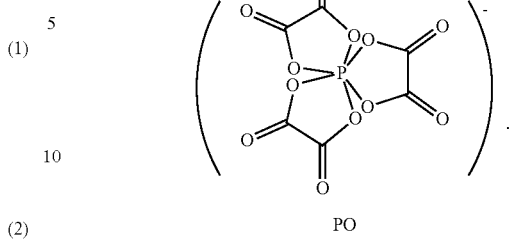

PO (5)

2. The nonaqueous electrolytic solution according to claim 1, wherein the anions are BFO represented by Formula (1).

3. The nonaqueous electrolytic solution according to claim 1, wherein a content of the anions is 0.1 mol/L, to a saturated concentration with respect to the organic solvent.

4. A lithium secondary battery comprising:
a positive electrode including a positive electrode active material;
a negative electrode including a negative electrode active material that is a carbonaceous material storing and releasing the lithium ion; and
the nonaqueous electrolytic solution according to claim 1 is present between the positive electrode and the negative electrode and the nonaqueous electrolytic solution conducts a lithium ion.

\* \* \* \* \*